United States Patent [19]

Garrison, Jr.

[11] Patent Number: 4,548,978
[45] Date of Patent: Oct. 22, 1985

[54] FAST CRYSTALLIZING POLYESTER RESIN CONTAINING THREE-COMPONENT CRYSTALLIZATION SYSTEM

[75] Inventor: William E. Garrison, Jr., Wilmington, Del.

[73] Assignee: E. I. Du Pont de Nemours and Company, Wilmington, Del.

[21] Appl. No.: 704,532

[22] Filed: Feb. 22, 1985

Related U.S. Application Data

[63] Continuation-in-part of Ser. No. 582,991, Feb. 24, 1984.

[51] Int. Cl.$^4$ .................. C08L 67/02; C08L 71/02
[52] U.S. Cl. .................. 524/314; 260/DIG. 35; 524/537; 524/538; 524/539; 524/601; 524/605
[58] Field of Search .............. 260/DIG. 35; 524/314, 524/537, 538, 539, 601, 605

[56] References Cited

U.S. PATENT DOCUMENTS 3,663,653  5/1972  Frohlich et al. ............ 524/549
4,163,100  7/1979  Bier et al. .................. 525/3
4,207,230  6/1980  Bier et al. .................. 260/DIG. 35
4,212,791  7/1980  Avery et al. .............. 260/DIG. 35
4,322,335  3/1982  Nield ......................... 523/522
4,351,757  9/1982  Hoeschele .................. 524/169

FOREIGN PATENT DOCUMENTS 2015013  9/1979  United Kingdom ....... 260/DIG. 35

OTHER PUBLICATIONS

Coleman, Journal of Polymer Science, vol. XIV, pp. 15–28 (1954).

Primary Examiner—Ronald W. Griffin

[57]  ABSTRACT

Fast crystallizing polyester molding composition comprising (a) a PET or PET/PBT matrix resin having an inherent viscosity of at least 0.4, (b) polyalkylene oxide soft segments incorporated into the matrix resin, (c) a plasticizer of the formula

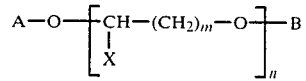

(d) a crystallization promoter, and (e) a reinforcing or filling material.

36 Claims, 11 Drawing Figures

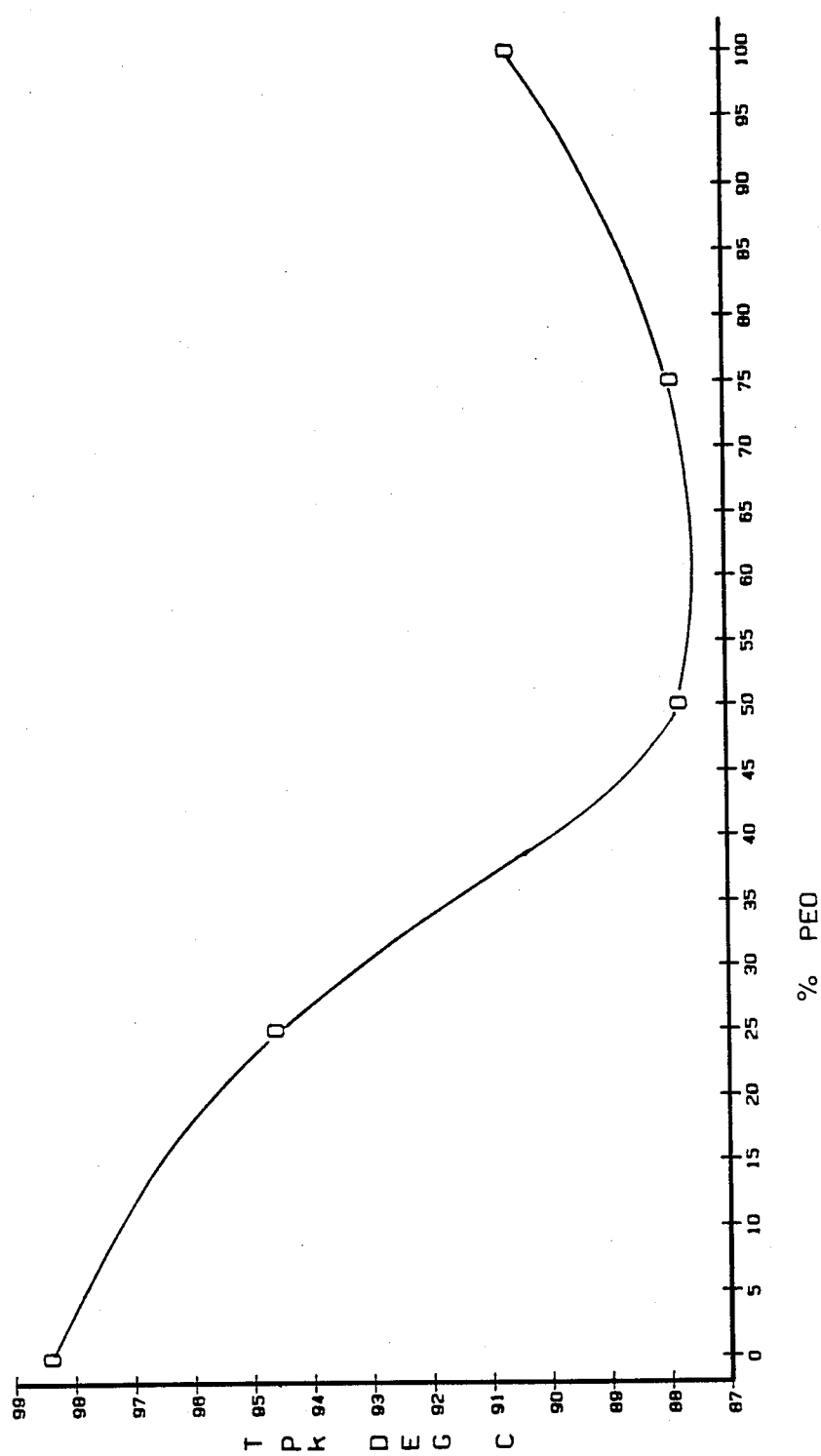

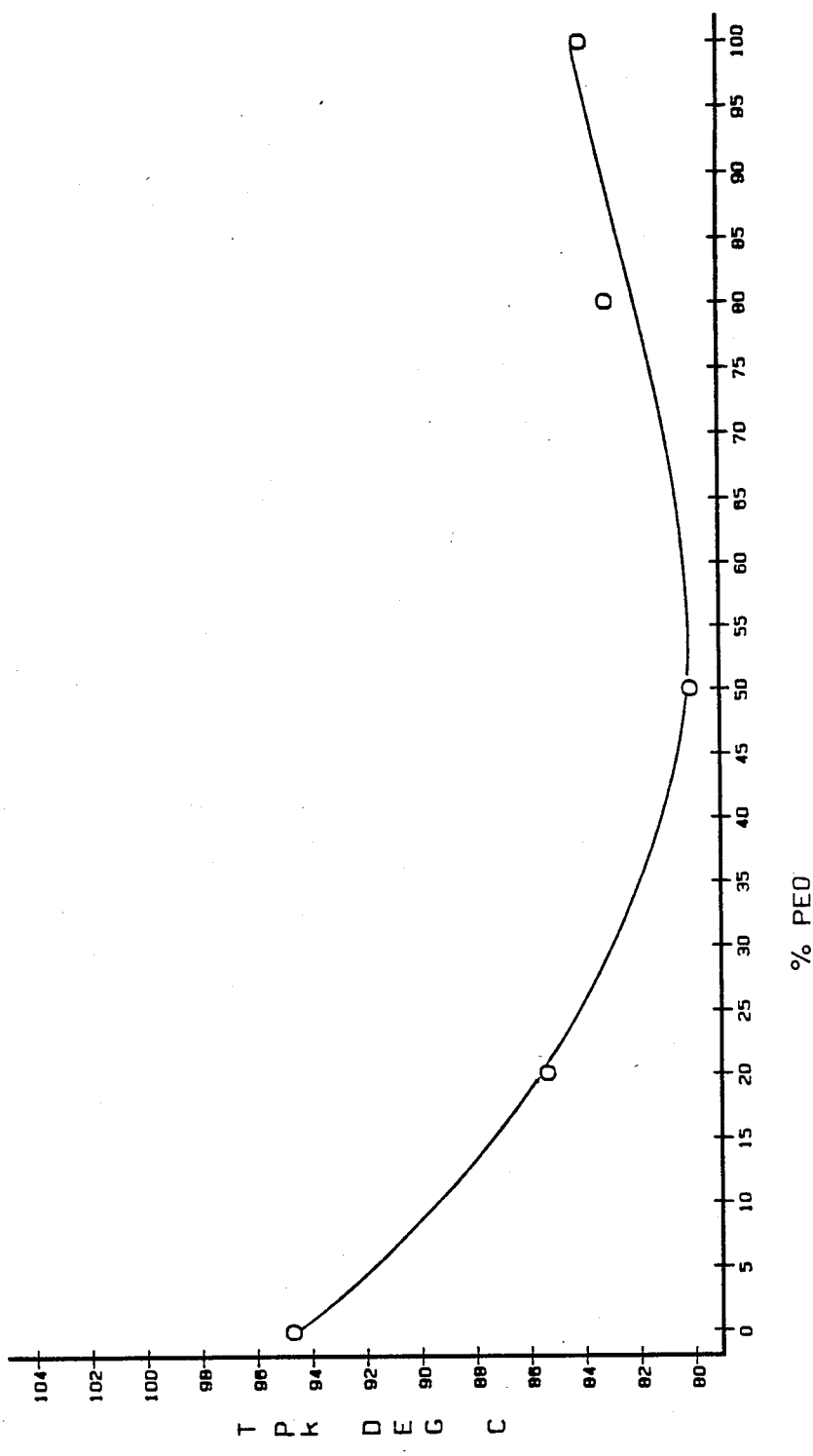

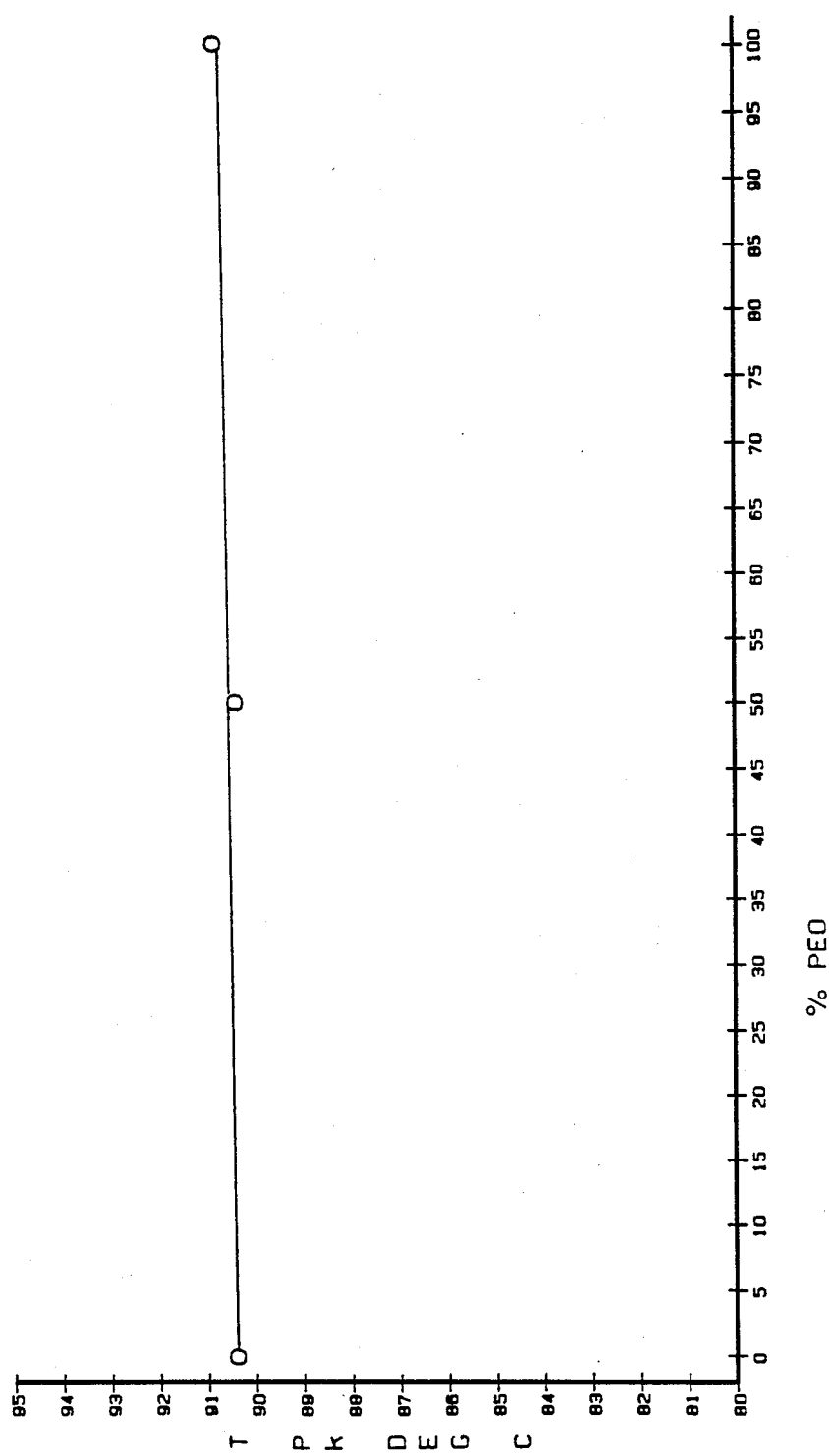

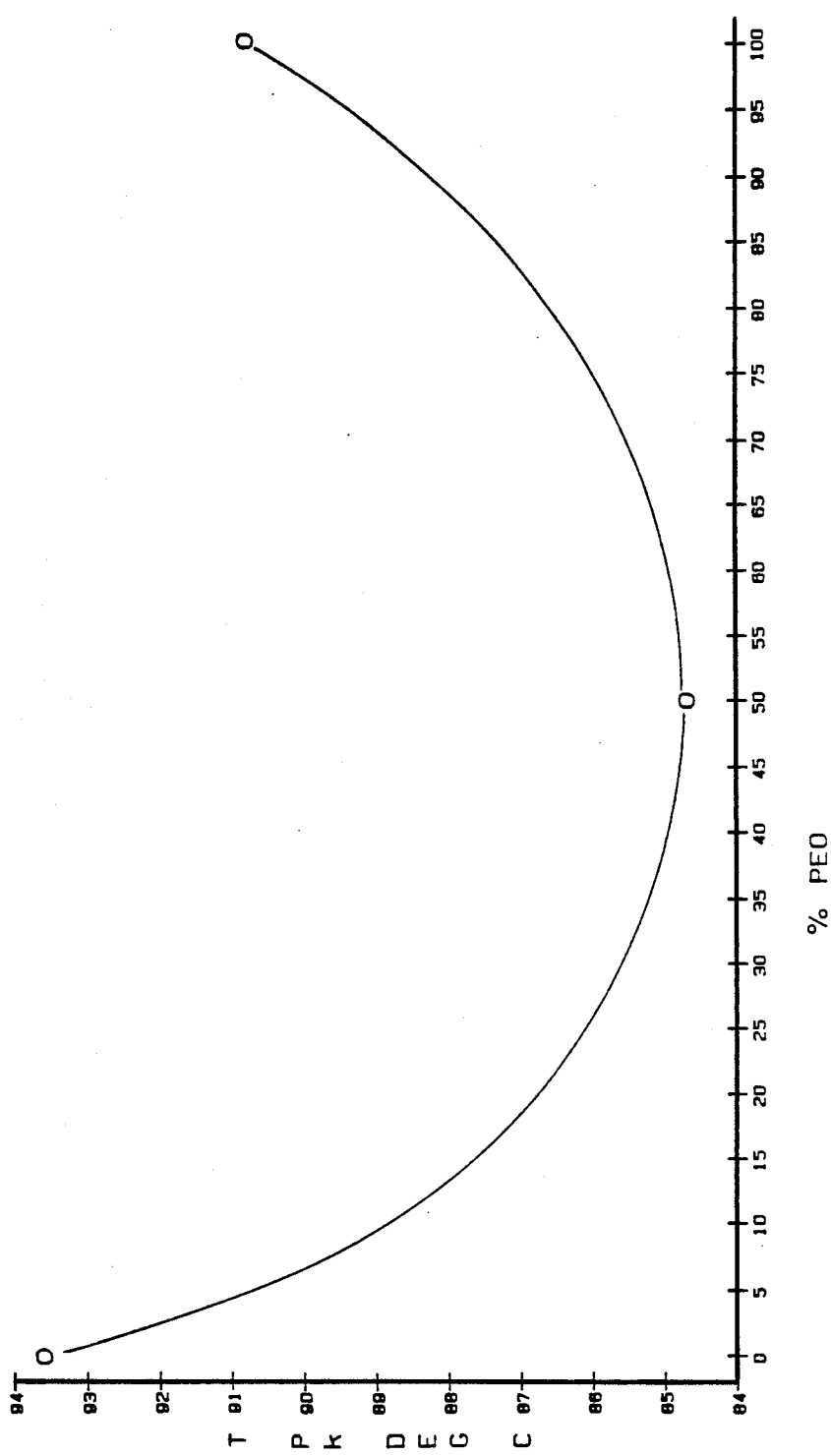

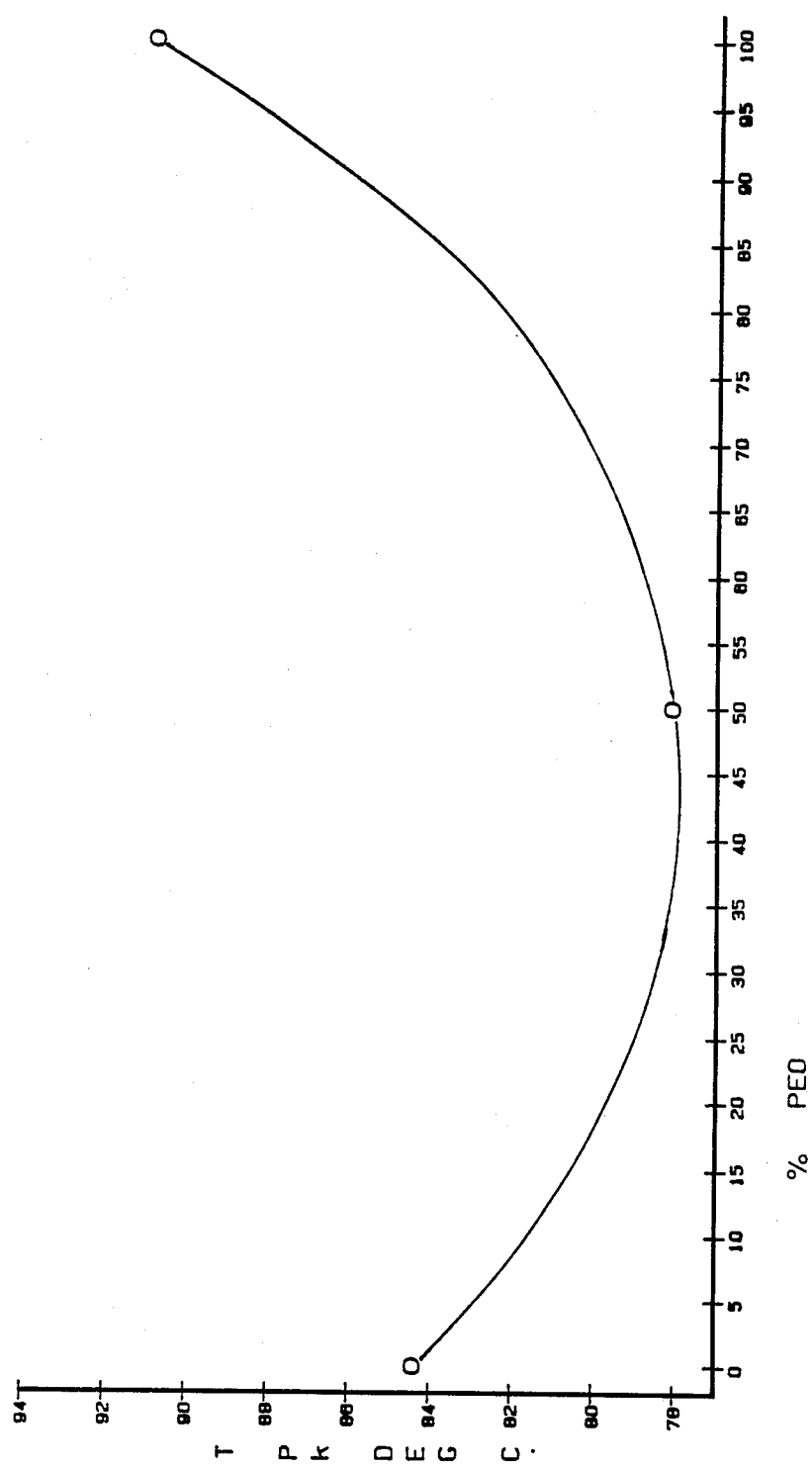

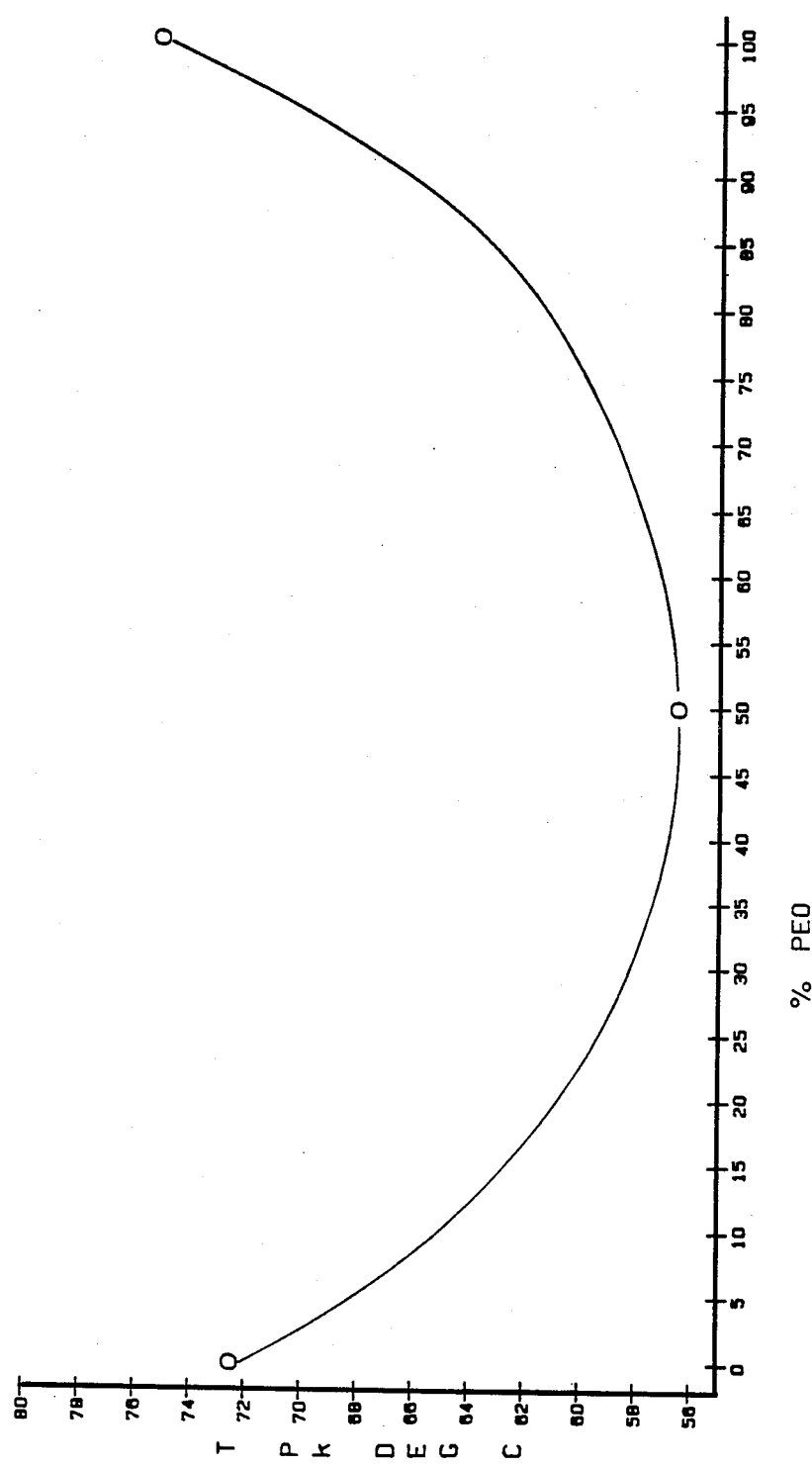

FAST CRYSTALLIZING POLYESTER RESIN CONTAINING THREE-COMPONENT CRYSTALLIZATION SYSTEM

CROSS-REFERENCE TO RELATED APPLICATION

This application is a continuation-in-part of U.S. application Ser. No. 582,991, filed Feb. 24, 1984.

DESCRIPTION

1. Technical Field

This invention relates to certain polyethylene terephthalate (PET) or polyethylene terephthalate/polybutylene terephthalate (PET/PBT) molding compositions characterized by a rapid rate of crystallization and the capacity to be molded into high quality molded articles at low molding temperatures. Polyethylene terephthalate is difficult to mold at molding temperatures below about 110° C. because its crystallization rate is slow and uneven. Moreover, articles molded from polyethylene terephthalate tend to stick to the mold and are difficult to remove.

Polyethylene terephthalate molding compositions containing crystallization rate enhancers can be molded at lower temperatures, e.g. 80°–100° C. to give high quality articles that are easily removed from the molds and that have glossy surfaces, even when glass reinforced. Such enhancers include (1) material derived from
  (a) hydrocarbon acids containing between about 7 and 54 carbon atoms or organic polymers having at least one carboxyl group attached thereto, and
  (b) sodium and/or potassium ion sources capable of reacting with the carboxyl in the acid or polymer of (a), and (2) selected low molecular weight organic compounds including esters, ketones, sulfones, sulfoxides, nitriles and amides.

However, when the need exists for very fast crystallization rates or even lower mold temperatures, merely adding greater quantities of the above-mentioned crystallization enhancers is not satisfactory, because the incremental effect of such enhancers frequently diminishes with greater quantities of the same, and large quantities of such enhancers can have an adverse effect on the physical properties of molded articles made from compositions containing the same.

The need exists for compositions that have the capacity to be molded into high quality molded articles at low molding temperatures and at a rapid rate of crystallization, without any significant adverse effect on the physical properties of the articles.

2. Background Art

U.S. Pat. No. 3,663,653 granted May 16, 1972 to Frohlich et al. discloses that polyethylene terephthalate molding compositions can be modified to have a higher crystallization speed by incorporating "soft segments" of polytetrahydrofuran (i.e. polytetramethylene ether glycol) into the PET polymer chain.

Coleman, Journal of Polymer Science, Volume XIV, pages 15–28 (1954) discloses that polyethylene terephthalate can be modified to lower its second order transition temperature (i.e. glass transition temperature) by incorporating "soft segments" of polyoxyethylene glycol into the PET polymer chain.

U.K. Pat. No. 2,015,013, published Sept. 5, 1979 discloses polyethylene terephthalate molding compositions containing crystallization rate enhancers, such as sodium or potassium salts of organic polymers containing pendant carboxyl groups and various low molecular weight organic esters.

U.S. Pat. No. 4,322,335 granted March 30, 1982 to Nield discloses polyethylene terephthalate molding compositions which have been modified to increase the crystallization rate by incorporating "soft segments" of polyoxyalkylene glycols into the PET polymer chain. Nield also generally discloses that his compositions can include external plasticizers as well; however, neither Nield nor any of the other references cited and briefly discussed above exemplify compositions containing the three-component crystallization system of the present invention or that there exists a synergistic relationship between the "soft segment" incorporated into the PET polymer chain and the particular class of external plasticizers used in the compositions of the present invention.

BRIEF DESCRIPTION OF THE DRAWINGS

FIGS. 1–11 show a schematic representation of the data from Examples 1–50 appearing in Table 2 below and graphically demonstrate the presence or absence of synergistic interaction between the polyalkylene oxide soft segment incorporated into the polymer chain of the matrix resin and a plasticizer. Each of the graphs in FIGS. 1–11 plots $T_{pk}$, which is a measure of the lowest mold surface temperature at which a particular composition can normally be molded to give a high quality fabricated article having acceptable surface properties, versus the weight percent of soft segment based on the total amount of soft segment plus plasticizer. Where the data gives a straight line, no synergism is shown, i.e. the effect of the soft segment and plasticizer on $T_{pk}$ is in direct linear proportion to relative amounts of the soft segment and plasticizer in the composition. Where the data gives a line that dips below a straight line connecting the two end points (0% soft segment/100% plasticizer and 100% soft segment/0% plasticizer) synergism is found, i.e. the effect on lowering the $T_{pk}$ of the mixture of soft segment and plasticizer is greater than the additive effect of equal quantities of the two ingredients used separately.

FIG. 1 represents the data of Examples 1–8
FIG. 2 represents the data of Examples 9–19
FIG. 3 represents the data of Examples 20–24
FIG. 4 represents the data of Examples 25–27
FIG. 5 represents the data of Examples 28–30
FIG. 6 represents the data of Examples 31–35
FIG. 7 represents the data of Examples 36–40
FIG. 8 represents the data of Examples 8, 41 and 42
FIG. 9 represents the data of Examples 8, 43 and 44
FIG. 10 represents the data of Examples 8, 45 and 46
FIG. 11 represents the data of Examples 48–50

DISCLOSURE OF THE INVENTION

Figure 1:
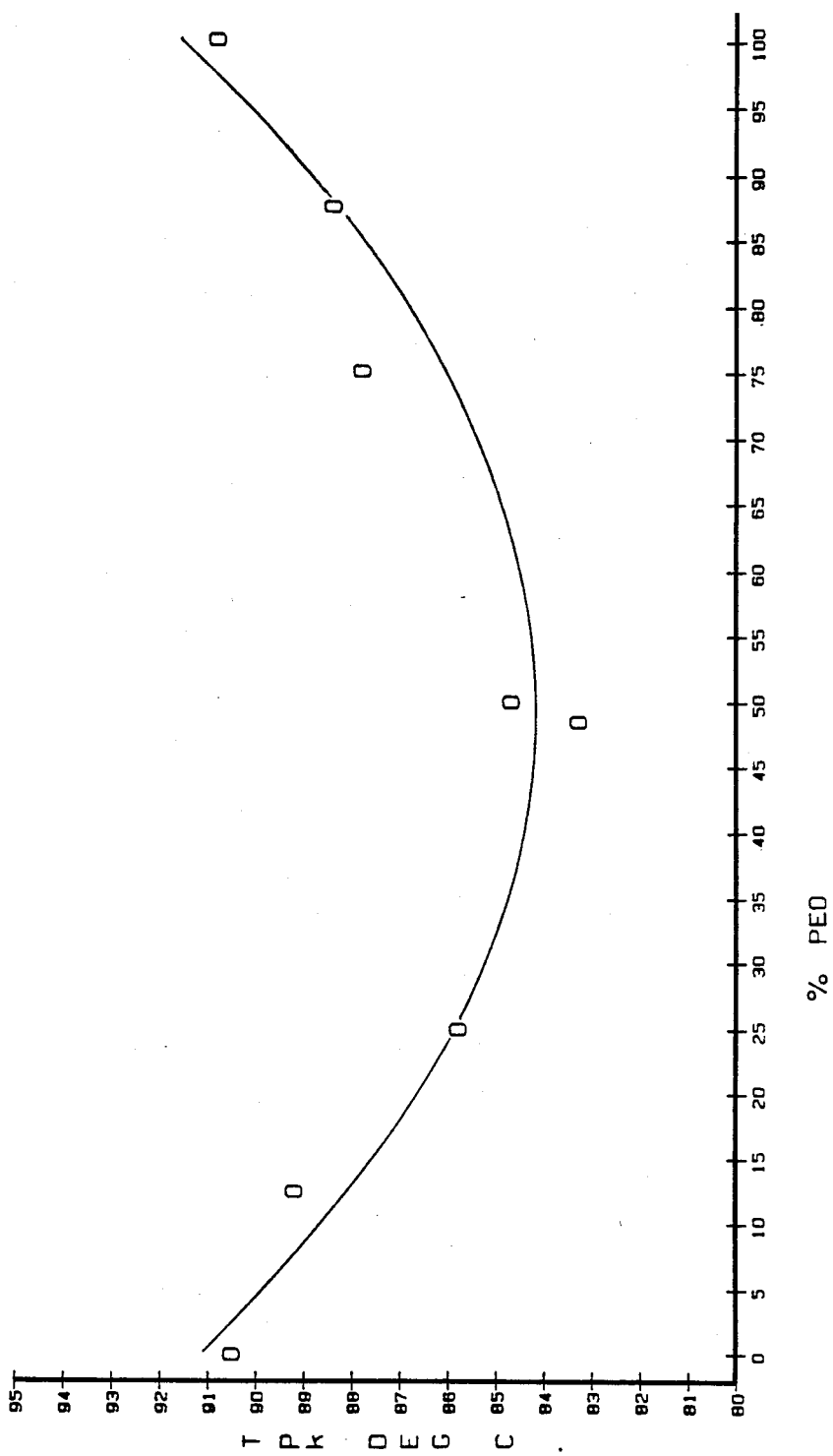

This invention relates to certain polyethylene terephthalate and polyethylene terephthalate/polybutylene terephthalate molding compositions characterized by a rapid rate of crystallization and the capacity to be molded into high quality molded articles at low molding temperatures. It has been found that certain known external plasticizers act synergistically in combination with "soft segments" incorporated into the PET or PET/PBT polymer chain, i.e. the beneficial effect on the crystallization rate and on the molding temperature necessary to achieve high quality molded articles, which beneficial effect would be expected from both the plasticizer and the "soft segment", is more than additive. This permits one to use a lower overall quantity of plasticizer and soft segment, thus minimizing the adverse effect on physical properties of the molded articles that would result from the use of the larger quantity that would be necessary to achieve an equivalent improvement in crystallization rate and necessary molding temperature if either were used alone.

More specifically, it has been found that certain diesters of polyalkylene glycols and monocarboxylic acids and certain monoesters of methoxy capped polyethylene glycol act synergistically in increasing the crystallization rate and therefore lowering the minimum molding temperature necessary to produce high quality molded articles from PET and PET/PBT molding compositions when such esters are used in combination with polyalkylene oxide "soft segments" incorporated into the polymer chain of such polyethylene terephthalate or polyethylene terephthalate/polybutylene terephthalate mixtures or copolymers, where such molding compositions also contain at least one crystallization promoter which is a material derived from:

(a) hydrocarbon acids containing between about 7 and 54 carbon atoms or organic polymers having at least one carboxyl group attached thereto, and (b) sodium and/or potassium ion sources capable of reacting with the carboxyl in the acid or polymer of (a).

The plasticizers which are useful in the compositions of the present invention are compounds of the formula

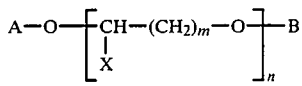

where
m is an integer from 1 to 3, inclusive,
n is an integer from 4 to 25 inclusive,
X is $CH_3$, $C_2H_5$ or H,
A is alkyl, acyl or aroyl of 1 to 10 carbon atoms, and
B is alkyl, acyl or aroyl of 1 to 10 carbon atoms.
Preferred plasticizers for use in the compositions of the present invention are those described above where
m is one, or where
n is 4 to 14, or where
X is H
and especially where m is one, n is 4 to 14, and X is H. More preferred plasticizers for use in the compostions of the present invention are those described above where
m is one, or where
n is 7 to 13, or where
X is H, or where
A is acyl of 8 carbon atoms or methyl, or where
B is acyl of 8 carbon atoms,
and especially where m is one, n is 7 to 13, X is H, A is acyl of 8 carbon atoms or methyl, and B is acyl of 8 carbon atoms. Polyethylene glycol 400 bis(2-ethylhexanoate), methoxy polyethylene glycol 550 2-ethylhexanoate and tetraethylene glycol bis(2-ethylhexanoate) are especially preferred. Polyethylene glycol 400 bis(2-ethylhexanoate) is most preferred.

The compositions of the present invention will normally contain from 1 to 15 parts by weight of the plasticizer per hundred parts of the matrix resin, with 2 to 12 parts plasticizer preferred and 4 to 8 parts plasticizer most preferred.

As indicated above, the matrix resin will be polyethylene terephthalate or mixtures and/or copolymers of polyethylene terephthalate and polybutylene terephthalate. Polyethylene terephthalate resins are preferred, especially those having an inherent viscosity of at least 0.4 as measured by ASTM D-2857. The polyethylene terephthalate preferably has an upper limit on inherent viscosity of 1.2. Inherent viscosity is measured in a 3:1 by volume ratio of methylene chloride and trifluoroacetic acid at 30° C. The polyethylene terephthalate can contain minor amounts of comonomers such as diethylene glycol or glutaric acid. Alternatively, mixtures and/or copolymers of polyethylene terephthalate and polybutylene terephthalate copolymer can be used, i.e. the polyethylene terephthalate can contain up to 30% by weight of polybutylene terephthalate. The polybutylene terephthalate can be incorporated into the polyethylene terephthalate by direct copolymerization of ethylene terephthalate units with butylene terephthalate units, by homopolymerization of ethylene terephthalate units followed by melt blending with up to 30% by weight of polybutylene terephthalate, or by homopolymerization of butylene terephthalate units followed by melt blending with at least 70% by weight of polyethylene terephthalate. In each of the latter two cases, some copolymerization is likely to occur by ester interchange. The compositions of the present invention will contain from 20–90% by weight of the matrix resin, preferably 30 to 80% and most preferably from 40 to 80%.

The compositions of the present invention will also contain 1–15 parts by weight of polyalkylene oxide "soft segments" incorporated into the matrix resin polymer chain per hundred parts of the matrix resin, preferably 2 to 12 parts, and most preferably 4 to 8 parts. The polyalkylene oxide is preferably predominantly polyethylene oxide and preferably is introduced into the polymer chain as a copolymer of polyethylene glycol terephthalate (optionally containing a minor proportion of other polyalkylene units) and polyethylene terephthalate, or is introduced into the polymer chain by reaction in the melt of polyethylene glycol (optionally containing a minor proportion of other polyalkylene units) with polyethylene terephthalate. When the matrix resin is a mixture and/or copolymer of polyethylene terephthalate and polybutylene terephthalate, the polyalkylene oxide can be incorporated into the polymer chain by direct copolymerization of polyethylene terephthalate, polybutylene terephthalate and polyalkylene glycol, by let down of polybutylene terephthalate/polyalkylene oxide copolymer with polyethylene terephthalate, or by direct addition of polyalkylene oxide to polyethylene terephthalate/polybutylene terephthalate copolymer. The molecular weight of the polyalkylene oxide should be in the range of 200 to 3250, preferably 600 to 1500. The total weight proportion of the soft segment plus the plasticizer in the compositions of the present invention will be from 9–20 parts by weight per hundred parts of the matrix resin, preferably 9–18 parts by weight and most preferably 12–18 parts by weight. Total amounts lower than 9 parts by weight per hundred parts of the matrix resin can be used but generally will not show the synergism seen with amounts equal to or greater than 9 parts. Similarly, amounts greater than 20 parts by weight per hundred parts of the matrix resin can be used, but will generally adversely affect physical properties and processing of the compositions. The relative quantities of soft segment and plasticizer in the compositions of the present invention can vary from 85:15 to 15:85, but preferably will be between 75:25 and 40:60, most preferably between 65:35 and 40:60.

In addition to the plasticizer, the matrix resin and the polyalkylene oxide "soft segments" incorporated therein, the compositions of the present invention should include 1 to 16 parts by weight of a crystallization promotor per hundred parts of the matrix resin, preferably 2 to 9 parts, most preferably 3 to 6 parts. The crystallization promoter is derived from (a) hydrocarbon acids containing between about 7 and 54 carbon atoms or organic polymers having at least one carboxyl group attached thereto, and (b) sodium and/or potassium ion sources capable of reacting with the carboxyl groups of the acids or polymers of (a).

The crystallization promotor should be such that it contains the sodium and/or potassium ion source in sufficient quantity such that the sodium and/or potassium concentration in matrix resin is greater than 0.01 weight percent. Preferably, the crystallization promoter is an organic ionic hydrocarbon copolymer of an α-olefin of 2–5 carbon atoms and an α,β-ethylenically unsaturated carboxylic acid of 3–5 carbon atoms in which the carboxyl groups have been at least partially neutralized with sodium or potassium cations. Other suitable crystallization promotors include materials derived from (a) polyethylene terephthalate and/or polybutylene terephthalate oligomer and (b) sodium and/or potassium ion sources capable of reacting with the carboxyl end groups on the oligomer(s) of (a). Further, it is preferred that the crystallization promoter be present in an amount sufficient to provide a $\Delta H_H/\Delta H_c$ ratio to the composition of less than 0.25. It has been found that the $\Delta H_H/\Delta H_c$ ratio is a convenient method of measuring the degree of crystallization. Procedures for measuring this ratio are described below in connection with the examples.

The compositions of the present invention can also contain reinforcing or filler material, such as glass, graphite or aramid fibers, glass beads, aluminum silicate, asbestos, mica, calcium carbonate and the like, and combinations of such materials. Glass fibers are preferred. The compositions of the present invention can contain up to 80% by weight of reinforcing or filling material, preferably 0–50%, and most preferably 0–45%. Compositions containing ethylene/butyl acrylate/glycidyl methacrylate elastomeric toughener and 2–8% glass fibers have shown surprisingly good Gardner impact and are especially preferred for certain end uses. Other compositions containing 25–45% glass fibers have shown remarkably good over-all balance of properties and are especially preferred for certain end uses.

Additional ingredients can be incorporated into the compositions of the present invention such as epoxy compounds, elastomeric tougheners (such as the ethylene/butyl acrylate/glycidyl methacrylate tougheners disclosed in copending U.S. application Ser. No. 582,988, filed Feb. 24, 1984 by E. J. Deyrup), lubricants, pigments, flame retardants, antioxidants, mold-release agents, ultraviolet light and heat stabilizers, nucleating agents and polymers used for convenience of processing to prepare concentrates.

The compositions of the present invention can be prepared by blending the various ingredients together by any convenient means to obtain an intimate blend. Neither temperature nor pressure are critical. For example, the matrix resin can be mixed dry in any suitable blender or tumbler with the other ingredients and the mixture melt extruded. The extrudate can be chopped. If desired, the reinforcing or filling agent can be omitted initially and added after the first melt extrusion, and the resulting mixture can then be melt extruded.

Accordingly, the compositions of the present invention comprise

A. 20–90% by weight based on the total of components A, B, C, D and E of a matrix resin having an inherent viscosity of at least 0.4, said matrix resin being selected from the group consisting of polyethylene terephthalate homopolymers, polyethylene terephthalate/polybutylene terephthalate mixtures, polyethylene terephthalate/polybutylene terephthalate copolymers and mixtures thereof, wherein said polyethylene terephthalate/polybutylene terephthalate copolymers and mixtures contain at least 70% by weight ethylene terephthalate units, B. 1–15 parts by weight per hundred parts of matrix resin A of polyalkylene oxide soft segments incorporated into the polymer chain of the matrix resin A, said polyalkylene oxide soft segments having a molecular weight of 200–3250, C. 1–15 parts by weight per hundred parts of matrix resin A of a plasticizer of the formula

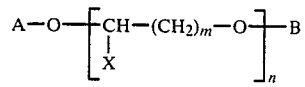

where
m is an integer from 1 to 3, inclusive,
n is an integer from 4 to 25, inclusive
A is alkyl, acyl or aroyl of 1 to 10 carbon atoms,
B is alkyl, acyl or aroyl of 1 to 10 carbon atoms, and
X is H, $CH_3$ or $C_2H_5$, D. 1–16 parts by weight per hundred parts the matrix resin A of a crystallization promoter derived from
(a) at least one source of carboxyl groups selected from the group consisting of hydrocarbon acids containing 7–54 carbon atoms and organic polymers having at least one carboxyl group attached thereto, and
(b) at least one source of metal ions capable of reacting with the carboxyl groups of (a) selected from the group consisting of sodium and potassium ion sources, where the concentration of said metal in said matrix resin (A) is at least 0.01 weight percent, and 0–80% by weight based on the total of components A, B, C, D and E of a material selected from the group consisting of reinforcing and filling materials.

In the following examples, there are shown specific embodiments of the present invention demonstrating the synergistic interaction of the polyalkylene oxide soft segment incorporated into the polymer chain of the matrix resin and the plasticizer as defined above. Additional control experiments demonstrate that such synergism is not found if the total quantity of soft segment and plasticizer is too small or if a plasticizer other than those defined as suitable for use in the compositions of the present invention is used. All parts and percentages are by weight, and all temperatures are in degrees Celsius unless otherwise specified. Measurements not originally in SI units have been so converted and rounded where appropriate.

In the following examples, tensile strength and elongation were measured on injection molded bars by ASTM Method D-638. The strain rate used was 0.2 inches/minute for reinforced and 2.0 inches/minute for unreinforced compositions. Notched Izod was measured by ASTM Method D-256, and unnotched impact strength was measured in a similar fashion on test bars annealed 16 hours at 150° C. in nitrogen and not notched. Flexural modulus was measured according to ASTM Method D-790, and heat deflection temperature was measured according to ASTM Method D-648 at a fiber stress of 264 p.s.i.

Thermal parameters were measured on approximately 20 mg samples from the centers of 1/16" bars using a Du Pont model 1090 thermal analyzer equipped with a 912 Differential Scanning Calorimeter with data plotted in the "time base" mode. $T_{pk}$ and $T_{freeze}$ are defined as the temperatures at the maximum of the crystallization exotherm obtained as the sample is respectively heated and later cooled at a rate of 10° C./minute. The W H ratio is the ratio of the integrated area under the $T_{pk}$ curve to that under the $T_{freeze}$ curve.

Each of the glass reinforced compositions in the following examples, except in Examples 20-23, was prepared by manually dry blending all of the ingredients and the resulting mixture was then extruded through a two-stage two-inch single screw extruder at a melt temperature of 285°-300° C. and a vacuum of 25-28 inches of mercury. In Examples 20-23, a portion of the plasticizer was precompounded into a 12% concentrate with polyethylene terephthalate in a 28 mm Werner and Pfleiderer twin screw extruder. This concentrate was then blended with the other ingredients as described above. Each of the unreinforced compositions in the following examples was prepared by dry blending all the ingredients except the plasticizer, and then compounding the mixture in a 28 mm Werner and Pfleiderer twin screw extruder with the plasticizer being injected into the melt through the extruder barrel using a metering pump. The extruded strand was quenched in water and cut into pellets which were then dried at about 95° C. in a dehumidified air oven for 16 hours. The dried pellets were injection molded into test bars using a 6 oz. Van Dorn reciprocating screw machine with a fast ram speed. Mechanical properties were determined on test bars molded at a mold cavity temperature of about 105° C. $T_{pk}$ and other thermal properties were determined on test bars molded at a mold cavity temperature of about 50° C.

The ingredients used in each of the following examples are summarized as follows:

PET=polyethylene terephthalate homopolymer having an inherent viscosity of 0.6 as measured at 30° C. at a concentration of 0.50 g/100 ml in a mixture of 1 part trifluoroacetic acid and 3 parts of dichloromethane for the reinforced compositions. For the unreinforced compositions PET with inherent viscosity of 0.72 was used.

PBT=polybutylene terephthalate homopolymer having an inherent viscosity of 0.8 (measured as described above for PET)

PEOT/PET=copolymer of polyethylene oxide terephthalate with polyethylene terephthalate which contains 19.6% polyethylene oxide 1450, the copolymer having an inherent viscosity of about 0.6 (measured as described above for PET) and containing 0.4% phenolic antioxidant.

Plasticizer A=polyethylene glycol 400 bis(2-ethylhexanoate).

Plasticizer B=tetraethylene glycol bis(2-ethylhexanoate).

Plasticizer C=methoxy polyethylene glycol 550 2-ethylhexanoate

Plasticizer D=neopentyl glycol dibenzoate.

Crystallization Promoter=copolymer of ethylene and 15% by weight methacrylic acid neutralized approximately 60% with sodium.

"Epon" 1009=condensation product of epichlorohydrin and Bisphenol A having a molecular weight of 4000–8000 and approximately 0.53% oxixane oxygen.

TABLE 1

COMPOSITION OF EXAMPLES 1 TO 50

| EXAMPLE NO. | % GLASS | % PET | % PBT | % PEOT/ PET COPOL | % CRYST. PROM. | % PLAST. | PLAST. TYPE | %* OTHER |
|---|---|---|---|---|---|---|---|---|
| 1 | 30 | 57.5 | 0.0 | 0.0 | 3.8 | 7.9 | A | 0.8 |
| 2 | 30 | 53.5 | 0.0 | 5.0 | 3.8 | 6.9 | A | 0.8 |
| 3 | 30 | 49.5 | 0.0 | 10.0 | 3.8 | 5.9 | A | 0.8 |
| 4 | 30 | 42.7 | 0.0 | 18.8 | 3.8 | 3.9 | A | 0.8 |
| 5 | 30 | 41.5 | 0.0 | 20.0 | 3.8 | 3.9 | A | 0.8 |
| 6 | 30 | 33.3 | 0.0 | 30.1 | 3.8 | 2.0 | A | 0.8 |
| 7 | 30 | 29.1 | 0.0 | 35.3 | 3.8 | 1.0 | A | 0.8 |
| 8 | 30 | 25.2 | 0.0 | 40.2 | 3.8 | 0.0 | — | 0.8 |
| 9 | 30 | 55.6 | 0.0 | 0.0 | 3.8 | 9.8 | A | 0.8 |
| 10 | 30 | 47.4 | 0.0 | 10.2 | 3.8 | 7.8 | A | 0.8 |
| 11 | 30 | 35.5 | 0.0 | 25.0 | 3.8 | 4.9 | A | 0.8 |
| 12 | 30 | 35.5 | 0.0 | 25.0 | 3.8 | 4.9 | A | 0.8 |
| 13 | 30 | 31.1 | 0.0 | 30.3 | 3.8 | 4.0 | A | 0.8 |
| 14 | 30 | 27.1 | 0.0 | 35.3 | 3.8 | 3.0 | A | 0.8 |
| 15 | 30 | 25.5 | 0.0 | 37.5 | 3.8 | 2.4 | A | 0.8 |
| 16 | 30 | 23.4 | 0.0 | 40.0 | 3.8 | 2.0 | A | 0.8 |
| 17 | 30 | 21.4 | 0.0 | 42.5 | 3.8 | 1.5 | A | 0.8 |
| 18 | 30 | 19.0 | 0.0 | 45.4 | 3.8 | 1.0 | A | 0.8 |
| 19 | 30 | 15.4 | 0.0 | 50.0 | 3.8 | 0.0 | — | 0.8 |
| 20 | 30 | 53.6 | 0.0 | 0.0 | 3.8 | 11.8 | A | 0.8 |
| 21 | 30 | 41.2 | 0.0 | 15.0 | 3.8 | 9.2 | A | 0.8 |
| 22 | 30 | 29.5 | 0.0 | 30.0 | 3.8 | 5.9 | A | 0.8 |
| 23 | 30 | 17.5 | 0.0 | 45.0 | 3.8 | 2.9 | A | 0.8 |
| 24 | 30 | 5.4 | 0.0 | 60.0 | 3.8 | 0.0 | — | 0.8 |
| 25 | 30 | 59.5 | 0.0 | 0.0 | 3.8 | 5.9 | A | 0.8 |
| 26 | 30 | 47.5 | 0.0 | 15.0 | 3.8 | 2.9 | A | 0.8 |

TABLE 1-continued
COMPOSITION OF EXAMPLES 1 TO 50

| EXAMPLE NO. | % GLASS | % PET | % PBT | % PEOT/ PET COPOL | % CRYST. PROM. | % PLAST. | PLAST. TYPE | %* OTHER |
|---|---|---|---|---|---|---|---|---|
| 27 | 30 | 35.4 | 0.0 | 30.0 | 3.8 | 0.0 | — | 0.8 |
| 28 | 30 | 61.5 | 0.0 | 0.0 | 3.8 | 3.9 | A | 0.8 |
| 29 | 30 | 53.4 | 0.0 | 10.0 | 3.8 | 2.0 | A | 0.8 |
| 30 | 30 | 45.4 | 0.0 | 20.0 | 3.8 | 0.0 | — | 0.8 |
| 31 | 15 | 69.9 | 0.0 | 0.0 | 4.7 | 9.6 | A | 0.8 |
| 32 | 15 | 60.1 | 0.0 | 12.2 | 4.7 | 7.2 | A | 0.8 |
| 33 | 15 | 50.2 | 0.0 | 24.5 | 4.7 | 4.8 | A | 0.8 |
| 34 | 15 | 40.4 | 0.0 | 36.7 | 4.7 | 2.4 | A | 0.8 |
| 35 | 15 | 30.5 | 0.0 | 49.0 | 4.7 | 0.0 | — | 0.8 |
| 36 | 0 | 80.0 | 0.0 | 0.0 | 5.1 | 14.1 | A | 0.8 |
| 37 | 0 | 68.4 | 0.0 | 14.4 | 5.1 | 11.3 | A | 0.8 |
| 38 | 0 | 51.1 | 0.0 | 36.0 | 5.1 | 7.0 | A | 0.8 |
| 39 | 0 | 33.8 | 0.0 | 57.5 | 5.1 | 2.8 | A | 0.8 |
| 40 | 0 | 22.2 | 0.0 | 71.9 | 5.1 | 0.0 | — | 0.8 |
| 41 | 30 | 57.5 | 0.0 | 0.0 | 3.8 | 7.9 | D | 0.8 |
| 42 | 30 | 41.5 | 0.0 | 20.0 | 3.8 | 3.9 | D | 0.8 |
| 43 | 30 | 57.5 | 0.0 | 0.0 | 3.8 | 7.9 | B | 0.8 |
| 44 | 30 | 41.5 | 0.0 | 20.0 | 3.8 | 3.9 | B | 0.8 |
| 45 | 30 | 57.5 | 0.0 | 0.0 | 3.8 | 7.9 | C | 0.8 |
| 46 | 30 | 41.5 | 0.0 | 20.0 | 3.8 | 3.9 | C | 0.8 |
| 47 | 30 | 42.1 | 0.0 | 20.0 | 3.8 | 3.9 | A | 0.2 |
| 48 | 30 | 40.2 | 17.0 | 0.0 | 3.8 | 7.9 | A | 0.8 |
| 49 | 30 | 8.1 | 17.0 | 40.0 | 3.8 | 0.0 | — | 0.8 |
| 50 | 30 | 24.2 | 17.0 | 20.0 | 3.8 | 3.9 | A | 0.8 |

*Example 47 contains 0.2% "Irganox" 1010. All others contain 0.6% "Epon" 1009 + 0.2% "Irganox" 1010.

TABLE 2
$T_{pk}$ AS A FUNCTION OF COMPOSITION

| EXAMPLE NO. | % GLASS | PLAST. TYPE | 100(PLAST. + PEO) PLAST. + PEO + PET | 100(PEO) PLAST. + PEO | $T_{pk}$ (DEG. C.) |
|---|---|---|---|---|---|
| 1 | 30 | A | 12 | 0.0 | 90.5 |
| 2 | 30 | A | 12 | 12.5 | 89.2 |
| 3 | 30 | A | 12 | 25.0 | 85.8 |
| 4 | 30 | A | 12 | 48.5 | 83.3 |
| 5 | 30 | A | 12 | 50.0 | 84.7 |
| 6 | 30 | A | 12 | 75.0 | 87.8 |
| 7 | 30 | A | 12 | 87.5 | 88.4 |
| 8 | 30 | — | 12 | 100.0 | 90.8 |
| 9 | 30 | A | 15 | 0.0 | 91.0 |
| 10 | 30 | A | 15 | 20.0 | 89.3 |
| 11 | 30 | A | 15 | 50.0 | 78.0 |
| 12 | 30 | A | 15 | 50.0 | 78.1 |
| 13 | 30 | A | 15 | 60.0 | 78.6 |
| 14 | 30 | A | 15 | 70.0 | 79.0 |
| 15 | 30 | A | 15 | 75.0 | 79.9 |
| 16 | 30 | A | 15 | 80.0 | 80.0 |
| 17 | 30 | A | 15 | 85.0 | 81.6 |
| 18 | 30 | A | 15 | 90.0 | 82.4 |
| 19 | 30 | — | 15 | 100.0 | 84.5 |
| 20 | 30 | A | 18 | 0.0 | 89.7 |
| 21 | 30 | A | 18 | 25.0 | 77.3 |
| 22 | 30 | A | 18 | 50.0 | 69.8 |
| 23 | 30 | A | 18 | 75.0 | 70.8 |
| 24 | 30 | — | 18 | 100.0 | 77.9 |
| 25 | 30 | A | 9 | 0.0 | 93.7 |
| 26 | 30 | A | 9 | 50.0 | 93.5 |
| 27 | 30 | — | 9 | 100.0 | 95.8 |
| 28 | 30 | A | 6 | 0.0 | 98.4 |
| 29 | 30 | A | 6 | 50.0 | 100.2 |
| 30 | 30 | — | 6 | 100.0 | 102.2 |
| 31 | 15 | A | 12 | 0.0 | 98.4 |
| 32 | 15 | A | 12 | 25.0 | 94.6 |
| 33 | 15 | A | 12 | 50.0 | 87.8 |
| 34 | 15 | A | 12 | 75.0 | 87.9 |
| 35 | 15 | — | 12 | 100.0 | 90.6 |
| 36 | 0 | A | 15 | 0.0 | 94.7 |
| 37 | 0 | A | 15 | 20.0 | 85.4 |
| 38 | 0 | A | 15 | 50.0 | 80.1 |
| 39 | 0 | A | 15 | 80.0 | 83.1 |
| 40 | 0 | — | 15 | 100.0 | 84.0 |
| 41 | 30 | D | 12 | 0.0 | 90.4 |
| 42 | 30 | D | 12 | 50.0 | 90.4 |
| 43 | 30 | B | 12 | 0.0 | 93.6 |
| 44 | 30 | B | 12 | 50.0 | 84.7 |
| 45 | 30 | C | 12 | 0.0 | 84.4 |

TABLE 2-continued

$T_{pk}$ AS A FUNCTION OF COMPOSITION

| EXAMPLE NO. | % GLASS | PLAST. TYPE | 100(PLAST. + PEO) / PLAST. + PEO + PET | 100(PEO) / PLAST. + PEO | $T_{pk}$ (DEG. C.) |
| --- | --- | --- | --- | --- | --- |
| 46 | 30 | C | 12 | 50.0 | 78.1 |
| 47 | 30 | A | 12 | 50.0 | 85.6 |
| 48* | 30 | A | 12 | 0.0 | 72.5 |
| 49* | 30 | — | 12 | 100.0 | 75.2 |
| 50* | 30 | A | 12 | 50.0 | 56.5 |

*Contains PET/PBT mixture and/or copolymer.

TABLE 3

ADDITIONAL PROPERTIES OF EXAMPLES 1 TO 50

| EXAMPLE NO. | T FREEZE | H RATIO | UNNOTCHED IMPACT (J/m) | NOTCHED IZOD (J/m) | TENS. STR., (MPa) | ELONG. % | FLEXURAL MODULUS (MPa) |
| --- | --- | --- | --- | --- | --- | --- | --- |
| 1 | 218 | 0.00 | 587 | 123 | 124 | 2.23 | 8233 |
| 2 | 217 | 0.01 | 785 | 128 | 137 | 2.52 | 7833 |
| 3 | 217 | 0.02 | 870 | 139 | 132 | 2.25 | 7522 |
| 4 | 217 | 0.03 | 1105 | 139 | 130 | 2.97 | 6998 |
| 5 | 216 | 0.02 | 1052 | 144 | 136 | 3.18 | 7474 |
| 6 | 214 | 0.02 | 1185 | 144 | 130 | 3.98 | 7012 |
| 7 | 213 | 0.02 | 1228 | 149 | 132 | 3.99 | 6923 |
| 8 | 213 | 0.04 | 1228 | 144 | 132 | 3.97 | 7040 |
| 9 | 218 | 0.00 | 689 | 133 | 137 | 2.32 | 7978 |
| 10 | 217 | 0.02 | 838 | 139 | 130 | 2.62 | 7798 |
| 11 | 216 | 0.02 | 1121 | 149 | 123 | 3.40 | 6792 |
| 12 | 216 | 0.00 | 1078 | — | 120 | 3.20 | 6654 |
| 13 | 215 | 0.03 | 1169 | — | 123 | 3.75 | 6481 |
| 14 | 214 | 0.03 | 1228 | — | 120 | 3.93 | 6350 |
| 15 | 213 | 0.03 | 1308 | — | 117 | 4.00 | 6095 |
| 16 | 214 | 0.02 | 1254 | — | 115 | 4.17 | 6095 |
| 17 | 212 | 0.03 | 1281 | — | 113 | 4.13 | 5943 |
| 18 | 213 | 0.03 | 1313 | — | 119 | 4.48 | 6047 |
| 19 | 212 | 0.02 | 1286 | 155 | 117 | 4.68 | 6268 |
| 20 | 218 | 0.01 | 432 | 112 | 95 | 1.97 | 7453 |
| 21 | 216 | 0.03 | 646 | 133 | 101 | 2.12 | 6150 |
| 22 | 215 | 0.01 | 1089 | 160 | 110 | 3.10 | 6102 |
| 23 | 213 | 0.04 | 1249 | 171 | 106 | 4.28 | 5599 |
| 24 | 211 | 0.02 | 1356 | 171 | 103 | 4.98 | 5240 |
| 25 | 216 | 0.02 | 496 | — | 134 | 2.10 | 6929 |
| 26 | 215 | 0.04 | 988 | — | 143 | 3.10 | 8212 |
| 27 | 214 | 0.09 | 875 | — | 146 | 3.28 | 8274 |
| 28 | 216 | 0.07 | 902 | 117 | 146 | 2.60 | 8522 |
| 29 | 216 | 0.09 | 881 | — | 154 | 2.93 | 9005 |
| 30 | 214 | 0.12 | 961 | — | 163 | 3.17 | 9494 |
| 31 | 218 | 0.05 | 358 | 85 | 117 | 3.10 | 5433 |
| 32 | 217 | 0.02 | 358 | 80 | 113 | 3.33 | 4730 |
| 33 | 216 | 0.02 | 395 | 85 | 100 | 3.77 | 4027 |
| 34 | 215 | 0.02 | 448 | 85 | 96 | 4.03 | 3916 |
| 35 | 213 | 0.02 | 470 | 75 | 96 | 4.47 | 3896 |
| 36 | 217 | 0.00 | NO BREAK | 64 | 39 | 280 | 1703 |
| 37 | 216 | 0.00 | NO BREAK | 64 | 38 | 320 | 1345 |
| 38 | 215 | 0.02 | NO BREAK | 80 | 41 | 310 | 862 |
| 39 | 214 | 0.03 | NO BREAK | 80 | 39 | 330 | 731 |
| 40 | 212 | 0.01 | NO BREAK | 101 | 38 | 330 | 738 |
| 41 | 211 | 0.03 | 875 | — | 124 | 2.93 | 8998 |
| 42 | 213 | 0.02 | 1020 | 139 | 137 | 3.65 | 7516 |
| 43 | 217 | 0.04 | 854 | — | 132 | 2.40 | — |
| 44 | 215 | 0.02 | 956 | — | 130 | 3.30 | — |
| 45 | 218 | 0.02 | 651 | 144 | 132 | 2.70 | 7543 |
| 46 | 217 | 0.02 | 1094 | 149 | 132 | 3.02 | 6757 |
| 47 | 216 | 0.02 | 1009 | 133 | 137 | 2.82 | 7267 |
| 48 | 198 | 0.08 | 1105 | — | 130 | 2.75 | 6743 |
| 49 | 187 | 0.42 | 1297 | — | 123 | 4.33 | 5902 |
| 50 | 198 | 0.01 | 1158 | — | 120 | 3.42 | 5537 |

EXAMPLES 1–8

The data in Table 2 and the graph in FIG. 1 demonstrate that with a total of 12% of polyethylene oxide soft segment plus polyethylene glycol 400 bis(2-ethylhexanoate) plasticizer (based on the total quantity of soft segment, plasticizer and matrix resin) in a 30% glass-reinforced composition, $T_{pk}$ is reduced to less than 85° C., while an equivalent amount of either the soft segment or the plasticizer used alone gives compositions where the $T_{pk}$ is greater than 90° C. It can also be seen from Table 3 that increasing the proportion of soft segment also increases the elongation and impact values of the composition. It can be seen from Example 20, that even with 18% of polyethylene glycol 400 bis(2-ethylhexanoate) plasticizer (and no soft segment) the $T_{pk}$ is lowered to only slightly under 90° C.; and from Examples 19 and 24, that while 15% and 18% of soft segment (with no plasticizer) do lower the $T_{pk}$ to less than 85° C.

there is a substantial deterioration in physical properties (tensile strength and modulus).

EXAMPLES 9–19

Figure 2:
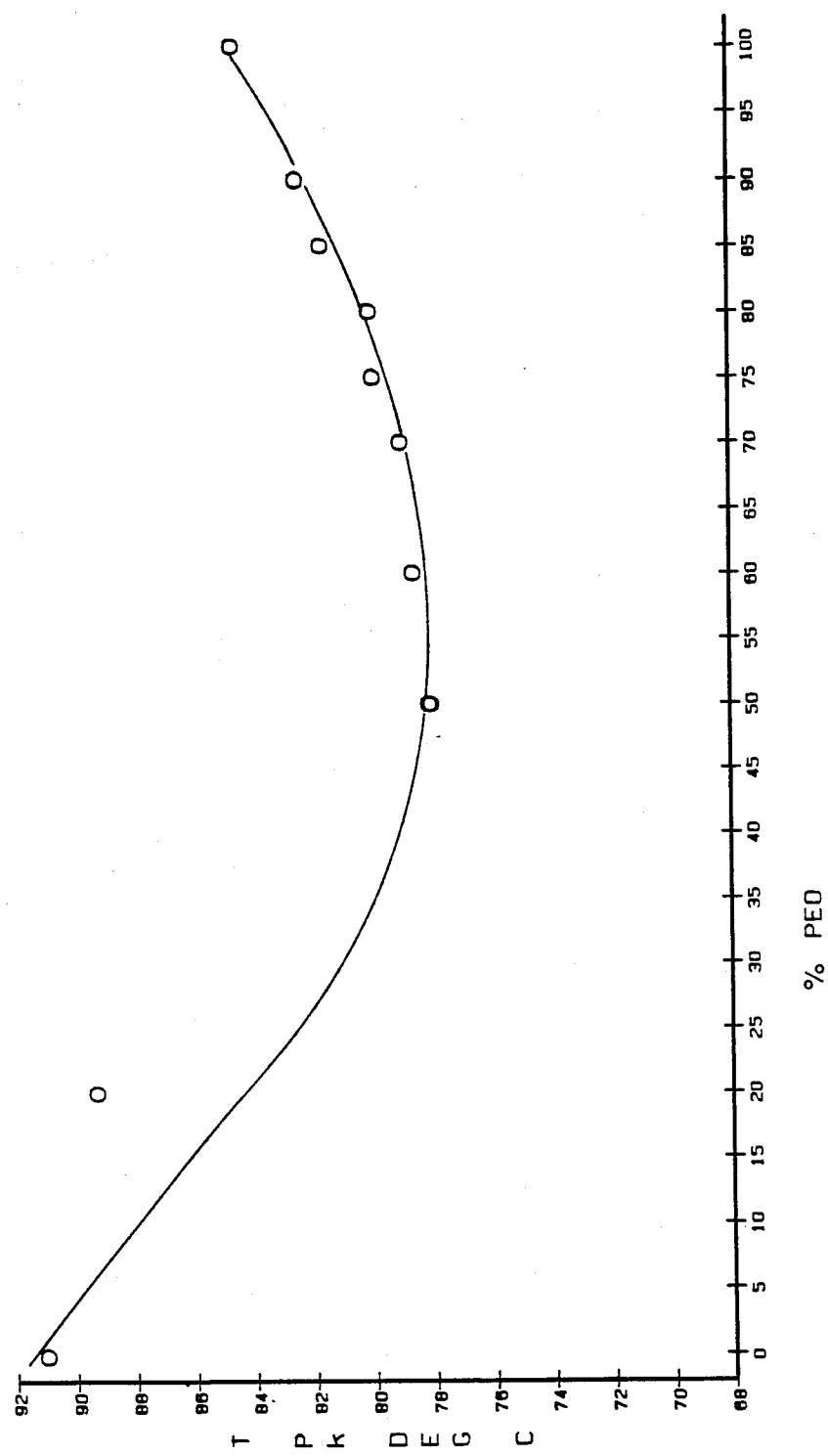

The data in Table 2 and the graph in FIG. 2 demonstrate that with a total of 15% (as compared with 12% in Examples 1-8) of polyethylene oxide soft segment plus polyethylene glycol 400 bis(2-ethylhexanoate) plasticizer (based on the total quantity of soft segment, plasticizer and matrix resin), in a 30% glass-reinforced composition, $T_{pk}$ is reduced to as low as 78° C., while an equivalent amount of either the soft segment or the plasticizer used alone gives compositions where the $T_{pk}$ is greater than 84° C. and 90° C., respectively.

EXAMPLES 20–24

Figure 3:
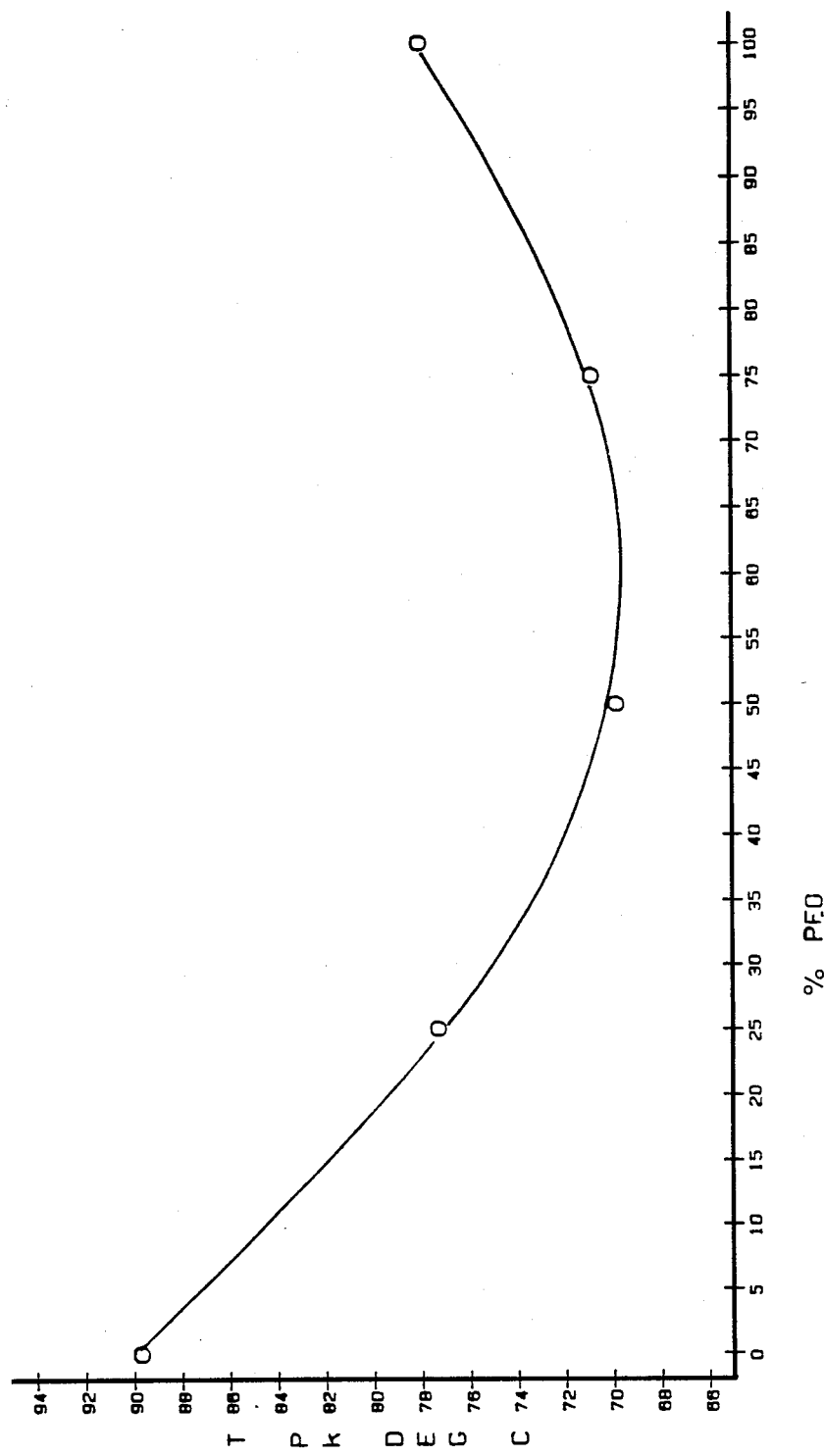

The data in Table 2 and the graph in FIG. 3 demonstrate that with a total of 18% (as compared with 12% in Examples 1-8) of polyethylene oxide soft segment plus polyethylene glycol 400 bis(2-ethylhexanoate) plasticizer (based on the total quantity of soft segment, plasticizer and matrix resin), in a 30% glass-reinforced composition, $T_{pk}$ is reduced to as low as 70° C., while an equivalent amount of either the soft segment or the plasticizer used alone gives compositions where the $T_{pk}$ is approximately 78° C. and 90° C., respectively.

EXAMPLES 25–27

Figure 4:
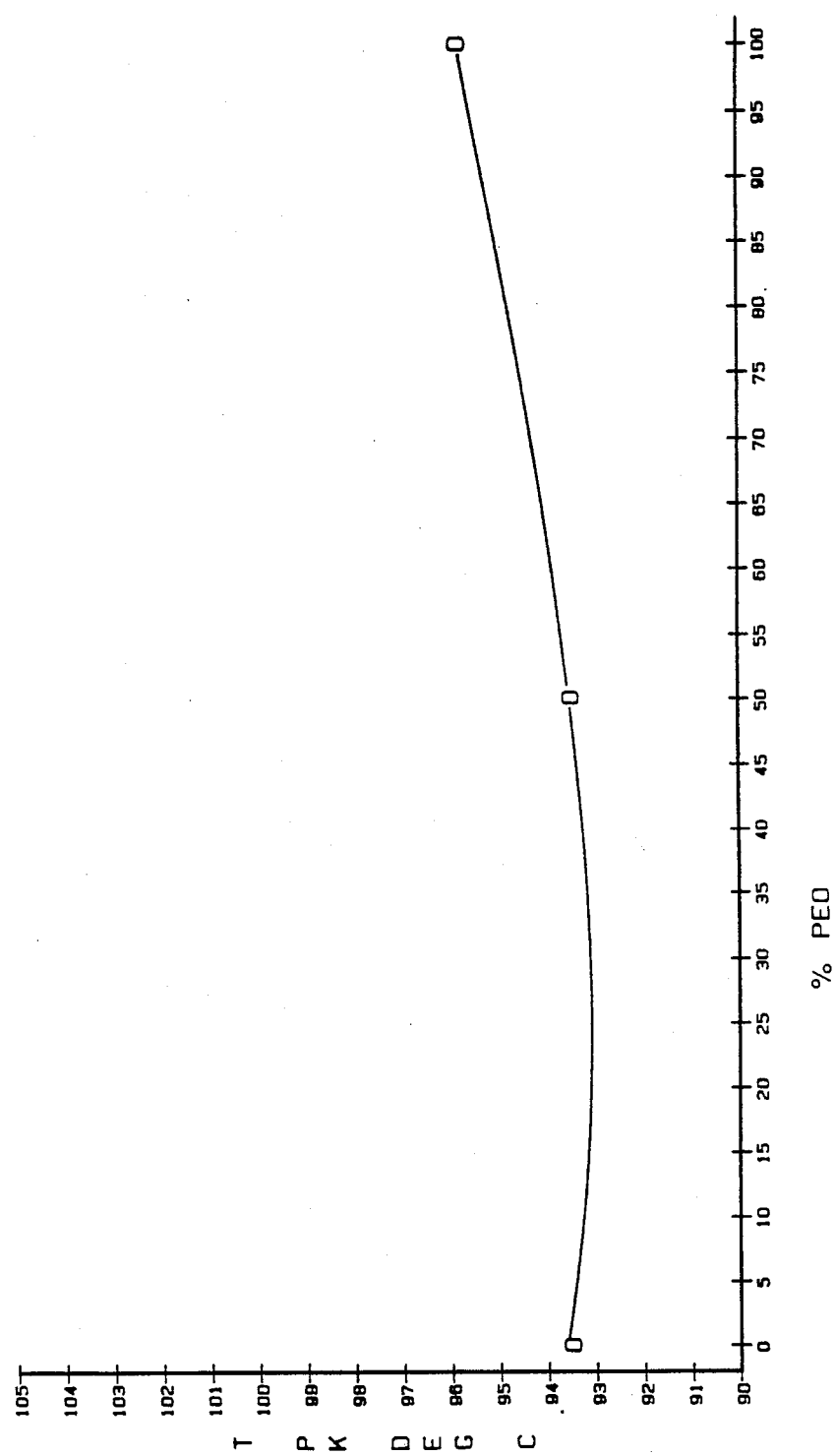

The data in Table 2 and the graph in FIG. 4 demonstrate that with a total of 9% (as compared with 12% in Examples 1-8) of polyethylene oxide soft segment plus polyethylene glycol 400 bis(2-ethylhexanoate) plasticizer (based on the total quantity of soft segment, plasticizer and matrix resin), in a 30% glass-reinforced composition, there is only a slight, but significant, synergistic relationship with respect to $T_{pk}$, i.e., the point at 50/50 PEO/plasticizer is only slightly below the straight line that would connect the two points at 0/100 and 100/0.

EXAMPLES 28–30

Figure 5:
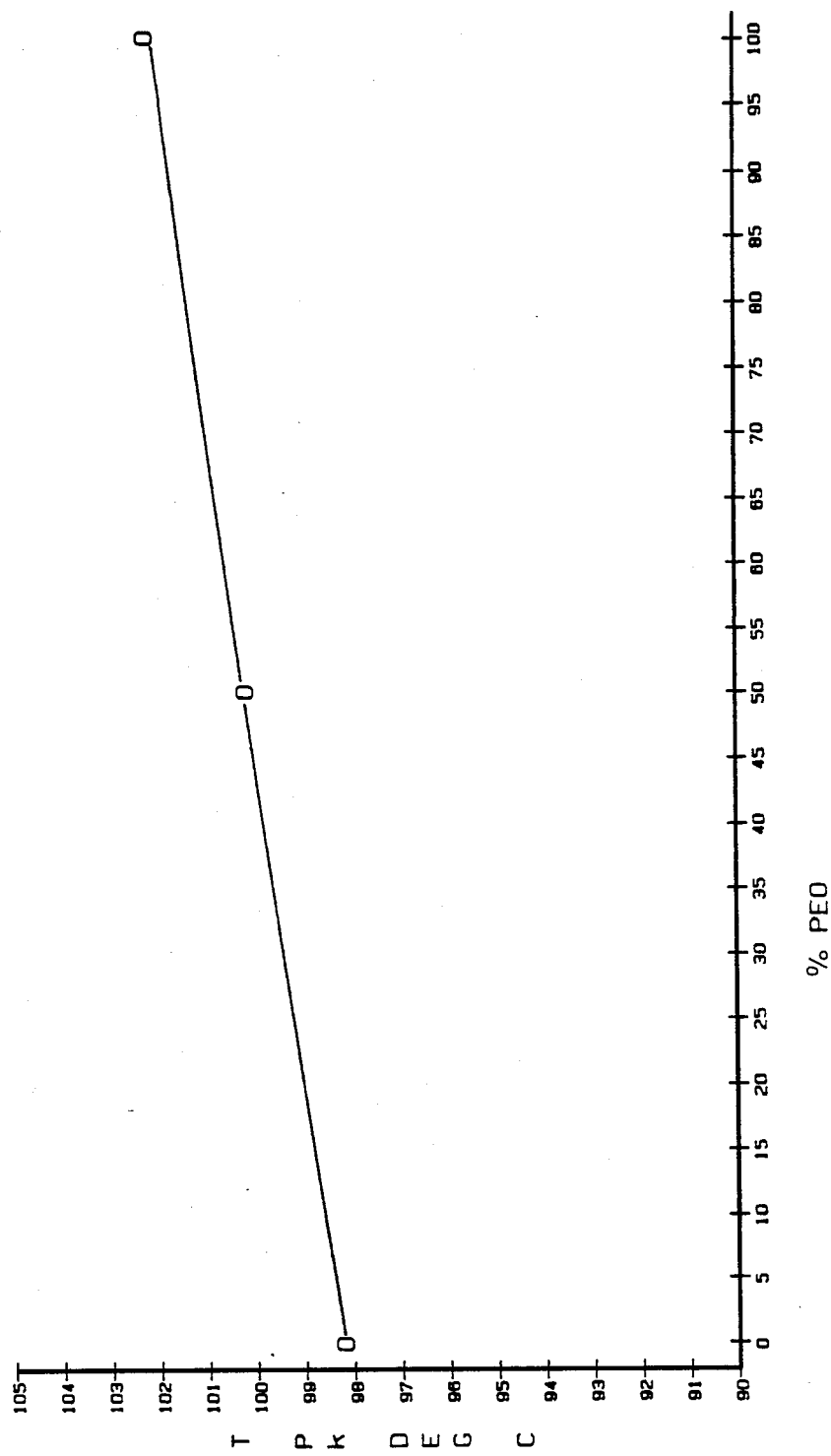

The data in Table 2 and the graph in FIG. 5 demonstrate that with a total of 6% (as compared with 12% in Examples 1-8) of polyethylene oxide soft segment plus polyethylene glycol 400 bis(2-ethylhexanoate) plasticizer (based on the total quantity of soft segment, plasticizer and matrix resin), in a 30% glass-reinforced composition, there is no significant observable synergistic relationship with respect to $T_{pk}$, i.e., when these two ingredients are used in combination at a total concentration of 6%, their effect is as would be expected from their effect individually at a comparable level. Their effect on lowering $T_{pk}$ is merely additive.

EXAMPLES 31–35

The data in Table 2 and the graph in FIG. 6 demonstrate that with a total of 12% of polyethylene oxide soft segment plus polyethylene glycol 400 bis(2-ethylhexanoate) plasticizer (based on the total quantity of soft segment, plasticizer and matrix resin), in a 15% (as compared with 30% in Examples 1-8) glass-reinforced composition, $T_{pk}$ is reduced to a point substantially below that which would be found in compositions containing an equivalent amount of either the soft segment or the plasticizer used alone. It can also be seen that the absolute values of $T_{pk}$ are somewhat higher in compositions containing 15% glass as compared with compositions containing 30% glass, and that this effect is more pronounced as the proportion of plasticizer is increased.

EXAMPLES 36–40

The data in Table 2 and the graph in FIG. 7 demonstrate that with a total of 15% (the same as in Examples 9-19) of polyethylene oxide soft segment plus polyethylene glycol 400 bis(2-ethylhexanoate) plasticizer, (based on the total quantity of soft segment, plasticizer and matrix resin), in a composition containing no filler or reinforcing material (as compared with 30% glass-reinforced compositions in Examples 9-19), $T_{pk}$ is reduced to a point substantially below that which would be found in compositions containing an equivalent amount of either the soft segment or the plasticizer used alone. It can also be seen that the absolute values of $T_{pk}$ are generally somewhat higher in compositions containing no filler or reinforcing material as compared with compositions containing 30% glass, and that this effect is more pronounced as the proportion of plasticizer is increased.

EXAMPLES 41–42

The data in Table 2 and the graph in FIG. 8 demonstrate that with a total of 12% of polyethylene oxide soft segment plus neopentyl glycol dibenzoate plasticizer (based on the total quantity of soft segment, plasticizer and matrix resin) (rather than polyethylene glycol 400 bis(2-ethylhexanoate) plasticizer as used in Examples 1-8), in a 30% glass-reinforced composition, there is no significant observable synergistic relationship with respect to $T_{pk}$, when these two ingredients are used in combination. Even at a total concentration of 12% (as was used in Examples 1-8), their effect is as would be expected from their effect individually at a comparable level. Their effect on lowering $T_{pk}$ is merely additive.

EXAMPLES 43–44

The data in Table 2 and the graph in FIG. 9 demonstrate that with a total of 12% of polyethylene oxide soft segment plus tetraethylene glycol bis(2-ethylhexanoate) plasticizer (based on the total quantity of soft segment, plasticizer and matrix resin) (rather than polyethylene glycol 400 bis(2-ethylhexanoate) plasticizer as used in Examples 1-8), in a 30% glass-reinforced composition, $T_{pk}$ is reduced to a point substantially below that which would be found in compositions containing an equivalent amount of either the soft segment or the plasticizer used alone. It can also be seen that the absolute values of $T_{pk}$ are quite comparable with tetraethylene glycol bis(2-ethyl-hexanoate) as with polyethylene glycol 400 bis(2-ethylhexanoate).

EXAMPLES 45–46

The data in Table 2 and the graph in FIG. 10 demonstrate that with a total of 12% of polyethylene oxide soft segment plus methoxy polyethylene glycol 550 2-ethylhexanoate plasticizer (based on the total quantity of soft segment, plasticizer and matrix resin) (rather than polyethylene glycol 400 bis(2-ethylhexanoate) plasticizer as used in Examples 1-8), in a 30% glass-reinforced composition, $T_{pk}$ is reduced to a point substantially below that which would be found in compositions containing an equivalent amount of either the soft segment or the plasticizer used alone. It can also be seen that the absolute values of $T_{pk}$ are actually somewhat lower in compositions containing the mono-methoxy plasticizer as compared with compositions containing the bis(2-ethylhexanoate) plasticizer.

EXAMPLE 47

The data in Table 2 (Examples 5 and 47) demonstrate that the presence or absence of 0.6% of "Epon" 1009 does not have a significant effect on $T_{pk}$. A small quantity of "Epon" 1009 added to the compositions of the present invention generally improves mechanical properties.

EXAMPLES 48–50

The data in Table 2 and the graph in FIG. 11 demonstrate that with a total of 12% polyethylene oxide soft segment plus polyethylene glycol 400 bis(2-ethylhexanoate) plasticizer (based on the total quantity of soft segment, plasticizer and matrix resin) in a 30% glass-reinforced polyethylene terephthalate/polybutylene terephthalate composition (rather than the polyethylene terephthalate composition used in Examples 1–8), $T_{pk}$ is reduced to a point substantially below that which would be found in compositions containing an equivalent amount of either the soft segment or the plasticizer used alone. It can also be seen that the absolute values of $T_{pk}$ are substantially lower in the PET/PBT compositions as compared with the straight PET compositions.

EXAMPLES 51–54

Polyethylene oxide terephthalate/polyethylene terephthalate copolymers containing 46% polyethylene oxide of various molecular weights from 400–1450 were let down to a level of 6% polyethylene oxide by compounding with polyethylene terephthalate in a 28 mm Werner and Pfleiderer extruder. These blends were then compounded with glass and the other ingredients used in the Examples described above in a 2 inch single screw extruder as described above. The compositions contained a total of 11.6% polyethylene oxide soft segment plus polyethylene glycol 400 bis(2-ethylhexanoate) plasticizer (based on the total quantity of soft segment, plasticizer and matrix resin) of which 48.7% was polyethylene oxide soft segment. The compositions each contained:

| | |
|---|---|
| polyethylene oxide | 3.7% |
| polyethylene terephthalate | 57.7% |
| plasticizer A | 3.9% |
| crystallization promotor | 3.8% |
| "Epon" 1009 | 0.6% |
| "Irganox" 1010 | 0.3% |
| glass fibers | 30.0% |
| | 100.0% |

The resulting compositions each had a $T_{pk}$ value below 85° C. The specific $T_{pk}$ value measured for each of the compositons is as follows:

| Average M.W. of the PEO | $T_{pk}$ (°C.) |
|---|---|
| 400 | 84.9 |
| 600 | 84.8 |
| 1000 | 84.8 |
| 1450 | 82.6 |

I claim:

1. A molding composition comprising
(A) 20–90% by weight based on the total of components A, B, C, D and E of a matrix resin having an inherent viscosity of at least 0.4, said matrix resin being selected from the group consisting of polyethylene terephthalate homopolymers, polyethylene terephthalate/polybutylene terephthalate mixtures, polyethylene terephthalate/polybutylene terephthalate copolymers, and mixtures thereof, wherein said polyethylene terephthalate/polybutylene terephthalate copolymers and mixtures contain at least 70% by weight ethylene terephthalate units,
(B) 1–15 parts by weight per hundred parts of matrix resin (A) of polyalkylene oxide soft segments incorporated into the polymer chain of matrix resin A, said polyalkylene oxide soft segments having a molecular weight of 200–3250,
(C) 1–15 parts by weight per hundred parts of matrix resin (A) of a plasticizer of the formula

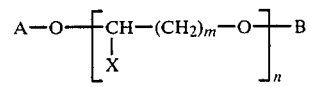

where
m is an integer from 1 to 3, inclusive,
n is an integer from 4 to 25, inclusive,
A is alkyl, acyl or aroyl of 1–10 carbon atoms,
B is alkyl, acyl or aroyl of 1–10 carbon atoms, and
X is H, $CH_3$ or $C_2H_5$,
(D) 1–16 parts by weight per hundred parts of matrix resin (A) of a crystallization promotor derived from
 (a) at least one source of carboxyl groups selected from the group consisting of hydrocarbon acids containing 7–54 carbon atoms and organic polymers having at least one carboxyl group attached thereto, and
 (b) at least one source of metal ions capable of reacting with the carboxyl groups of (a) selected from the group consisting of sodium and potassium ion sources, where the concentration of said metal in said matrix resin (A) is at least 0.01 weight percent, and
(E) 0–80% by weight based on the total of components A, B, C, D and E of a material selected from the group consisting of reinforcing and filling materials.

2. The compositions of claim 1 wherein the crystallization promotor is derived from
 (a) at least one source of carboxyl groups consisting of hydrocarbon acids containing 7–25 carbon atoms and organic polymers containing pendant carboxyl groups, and
 (b) at least one source of metal ions capable of reacting with the carboxyl groups of (a) selected from the group consisting of sodium and potassium ion sources.

3. The compositions of claim 1 wherein the plasticizer is as described above where m is one.

4. The compositions of claim 1 wherein the plasticizer is as described above where n is 4–14.

5. The compositions of claim 1 wherein the plasticizer is as described above where A is methyl or acyl of 8 carbon atoms.

6. The compositions of claim 1 wherein the plasticizer is as described above where B is acyl of 8 carbon atoms.

7. The composition of claim 1 wherein the plasticizer is as described above where X is H.

8. The compositions of claim 1 wherein the plasticizer is as described above where m is one, n is 4–14, and X is H.

9. The compositions of claim 8 wherein the plasticizer is as described above where A is methyl or acyl of 8 carbon atoms and B is acyl of 8 carbon atoms.

10. The compositions of claim 9 wherein the plasticizer is as described above where n is 7–13.

11. The compositions of claim 10 wherein the plasticizer is polyethylene glycol 400 bis(2-ethylhexanoate).

12. The compositions of claim 10 wherein the plasticizer is tetraethylene glycol bis(2-ethylhexanoate).

13. The compositions of claim 10 wherein the plasticizer is methoxy polyethylene glycol 550 2-ethylhexanoate.

14. The compositions of claim 1 wherein the plasticizer (C) comprises 2–12 parts by weight per hundred parts of matrix resin (A).

15. The compositions of claim 1 wherein the plasticizer (C) comprises 4–8 parts by weight per hundred parts of matrix resin (A).

16. The compositions of claim 1 wherein the matrix resin (A) is polyethylene terephthalate homopolymer.

17. The compositions of claim 16 wherein the polyethylene terephthalate homopolymer has an inherent viscosity of 0.4–1.2.

18. The compositions of claim 1 wherein the matrix resin (A) comprises 30–80% by weight of the composition based on the total of components A, B, C, D and E.

19. The compositions of claim 1 wherein the matrix resin (A) comprises 40–80% by weight of the composition based on the total of components A, B, C, D and E.

20. The compositions of claim 1 wherein the polyalkylene oxide soft segments (B) comprise 2–12 parts by weight per hundred parts of matrix resin (A).

21. The compositions of claim 1 wherein the polyalkylene oxide soft segments (B) comprise 4–8 parts by weight per hundred parts of matrix resin (A).

22. The compositions of claim 1 wherein the polyalkylene oxide is polyethylene oxide.

23. The compositions of claim 1 wherein the polyalkylene oxide soft segments have a molecular weight of 600–1500.

24. The compositions of claim 1 wherein the total proportion of the soft segments (B) and the plasticizer (C) is 9–20 parts by weight per hundred parts of matrix resin (A).

25. The compositions of claim 1 wherein the total proportion of the soft segments (B) and the plasticizer (C) is 9–18 parts by weight per hundred parts of matrix resin (A).

26. The compositions of claim 1 wherein the total proportion of the soft segments (B) and the plasticizer (C) is 12–18 parts by weight per hundred parts of matrix resin (A).

27. The compositions of claim 1 wherein the relative quantities of soft segment (B) and plasticizer (C) is from 85:15 to 15:85.

28. The compositions of claim 1 wherein the relative quantities of soft segment (B) and plasticizer (C) is from 75:25 to 40:60.

29. The compositions of claim 1 wherein the relative quantities of soft segment (B) and plasticizer (C) is from 65:35 to 40:60.

30. The compositions of claim 1 wherein the crystallization promotor (D) comprises 2–9 parts by weight per hundred parts of matrix resin (A).

31. The compositions of claim 1 wherein the crystallization promotor (D) comprises 3–6 parts by weight per hundred parts of matrix resin (A).

32. The compositions of claim 1 wherein the crystallization promotor (D) is an organic ionic hydrocarbon copolymer of an alpha-olefin of 2–5 carbon atoms and an alpha,beta-ethylenically unsaturated carboxylic acid of 3–5 carbon atoms in which the carboxyl groups have been at least partially neutralized with sodium or potassium cations.

33. The compositions of claim 1 wherein the reinforcing and filling materials (E) are selected from the group consisting of glass, graphite, and aramid fibers, glass beads, aluminum silicate, asbestos, mica and calcium carbonate.

34. The compositions of claim 1 wherein the reinforcing and filling material (E) is glass fibers.

35. Molded articles made from the composition of claim 1.

36. Molded articles comprising
(A) 20–90% by weight based on the total of components A, B, C, D and E of a matrix resin having an inherent viscosity of at least 0.4, said matrix resin being selected from the group consisting of polyethylene terephthalate homopolymers, polyethylene terephthalate/polybutylene terephthalate mixtures, polyethylene terephthalate/polybutylene terephthalate copolymers, and mixtures thereof, wherein said polyethylene terephthalate/polybutylene terephthalate copolymers and mixtures contain at least 70% by weight ethylene terephthalate units,
(B) 1–15 parts by weight per hundred parts of matrix resin (A) of polyalkylene oxide soft segments incorporated into the polymer chain of matrix resin A, said polyalkylene oxide soft segments having a molecular weight of 200–3250,
(C) 1–15 parts by weight per hundred parts of matrix resin (A) of a plasticizer of the formula

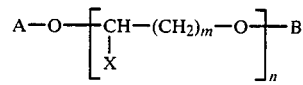

where
m is an integer from 1 to 3, inclusive,
n is an integer from 4 to 25, inclusive,
A is alkyl, acyl or aroyl of 1–10 carbon atoms,
B is alkyl, acyl or aroyl of 1–10 carbon atoms, and
X is H, CH$_3$ or C$_2$H$_5$,
(D) 1–16 parts by weight per hundred parts of matrix resin (A) of a crystallization promotor derived from
(a) at least one source of carboxyl groups selected from the group consisting of hydrocarbon acids containing 7–54 carbon atoms and organic polymers having at least one carboxyl group attached thereto, and
(b) at least one source of metal ions capable of reacting with the carboxyl groups of (a) selected from the group consisting of sodium and potassium ion sources, where the concentration of said metal in said matrix resin (A) is at least 0.01 weight percent, and
(E) 0–80% by weight based on the total of components A, B, C, D and E of a material selected from the group consisting of reinforcing and filling materials.

* * * * *